(12) United States Patent  
McGuire et al.

(10) Patent No.: US 9,772,031 B2
(45) Date of Patent: Sep. 26, 2017

(54) SHIFTER ASSEMBLY INCLUDING DISPLAY AND ACTUATION FOR DRIVER CONTROL

(75) Inventors: Sean McGuire, Rochester, MI (US); Charles Flynn, Davisburg, MI (US)

(73) Assignee: DURA Operating, LLC, Auburn Hills, MI (US)

( * ) Notice: Subject to any disclaimer, the term of this patent is extended or adjusted under 35 U.S.C. 154(b) by 108 days.

(21) Appl. No.: 13/121,780

(22) PCT Filed: Sep. 30, 2009

(86) PCT No.: PCT/US2009/059047
§ 371 (c)(1),
(2), (4) Date: Mar. 30, 2011

(87) PCT Pub. No.: WO2010/039845
PCT Pub. Date: Apr. 8, 2010

(65) Prior Publication Data
US 2011/0277578 A1    Nov. 17, 2011

Related U.S. Application Data

(60) Provisional application No. 61/101,434, filed on Sep. 30, 2008.

(51) Int. Cl.
*B60K 20/00* (2006.01)
*F16H 59/02* (2006.01)
*F16H 63/42* (2006.01)

(52) U.S. Cl.
CPC ......... *F16H 59/0278* (2013.01); *F16H 63/42* (2013.01); *Y10T 74/2014* (2015.01)

(58) Field of Classification Search
CPC ........... F16H 2061/226; F16H 2061/22; F16H 2063/204

USPC ........................................................ 74/473.3
See application file for complete search history.

(56) References Cited

U.S. PATENT DOCUMENTS

| | | | | |
|---|---|---|---|---|
| 5,579,660 A * | 12/1996 | Kemper et al. | | 74/473.3 |
| 5,992,264 A * | 11/1999 | Brock, Sr. | | 74/502.6 |
| 6,539,358 B1 * | 3/2003 | Coon et al. | | 704/275 |
| 6,788,528 B2 * | 9/2004 | Enners et al. | | 361/679.41 |
| 6,834,987 B2 * | 12/2004 | Zynda | | 362/487 |
| 7,104,152 B2 * | 9/2006 | Levin et al. | | 74/471 XY |
| 7,334,497 B2 * | 2/2008 | Giefer et al. | | 74/473.12 |
| 7,393,304 B2 * | 7/2008 | Wilde et al. | | 477/94 |
| 7,621,198 B2 * | 11/2009 | Kako et al. | | 74/523 |
| 7,631,917 B2 * | 12/2009 | Kwolek | | 296/24.34 |

(Continued)

FOREIGN PATENT DOCUMENTS

| | | |
|---|---|---|
| JP | 07-047855 A | 2/1995 |
| JP | 2006-273208 A | 10/2006 |
| KR | 20-0197121 Y1 | 9/2000 |

OTHER PUBLICATIONS http://www.caranddriver.com/photos-07q1/65786/2007-mercedes-benz-e63-amg-engine-start-stop-button-and-shift-lever-photo-66998.*
http://blog.carlist.my/2011/blog/7-series-bmw/.*

*Primary Examiner* — Zakaria Elahmadi
(74) *Attorney, Agent, or Firm* — Robert Ford; Steven L. Crane; Raymond J. Vivacqua

(57) ABSTRACT

A shifter assembly for a vehicle that includes a shift lever connected to a shifter and in communication with the vehicle and a transmission. A display is positioned on the shift lever indicating data of the vehicle or transmission. A start button is positioned on the shift lever and is linked with an ignition of the vehicle.

15 Claims, 7 Drawing Sheets

(56) References Cited

U.S. PATENT DOCUMENTS

| | | | |
|---|---|---|---|
| 7,650,810 B2* | 1/2010 | Levin et al. | 74/471 XY |
| 7,891,267 B2* | 2/2011 | Aso et al. | 74/473.18 |
| 7,930,004 B2* | 4/2011 | Seil et al. | 455/575.1 |
| 7,930,006 B2* | 4/2011 | Neu et al. | 455/575.1 |
| 8,196,491 B2* | 6/2012 | Wilson et al. | 74/473.23 |
| 2002/0152827 A1* | 10/2002 | Hayashi et al. | 74/473.3 |
| 2003/0106387 A1* | 6/2003 | Lee | 74/473.21 |
| 2004/0229726 A1 | 11/2004 | Wilde et al. | |
| 2008/0094199 A1* | 4/2008 | Kazyaka | 340/456 |
| 2009/0271080 A1* | 10/2009 | Pickering et al. | 701/51 |
| 2010/0078954 A1* | 4/2010 | Liu et al. | 296/24.34 |
| 2011/0023646 A1* | 2/2011 | Hanjono et al. | 74/473.3 |
| 2011/0067515 A1* | 3/2011 | Rake et al. | 74/473.3 |
| 2011/0132120 A1* | 6/2011 | Skogward | 74/473.3 |
| 2011/0160969 A1* | 6/2011 | Oguri et al. | 701/52 |

\* cited by examiner

SHIFTER ASSEMBLY INCLUDING DISPLAY AND ACTUATION FOR DRIVER CONTROL

CROSS-REFERENCE TO RELATED APPLICATION

This application claims priority of U.S. Provisional Patent Application Ser. No. 61/101,434 filed Sep. 30, 2008 and PCT/US2009/059047 filed Sep. 30, 2009, both of which are incorporated herein by reference.

FIELD OF THE INVENTION

The invention relates to shifter assemblies and with more particularity to shifter assemblies having a display and actuation button.

BACKGROUND OF THE INVENTION

Generally, shifter assemblies may include a lever that moves through a gate to position the transmission of a vehicle in various states. Typically an indicator may move through a lens or cover to indicate a position of the transmission. Such manually actuated indicators are limited to only displaying the position of the transmission.

Various systems in a vehicle or accessories connected to the vehicle may generate information that may be displayed to an operator. Typically that information is not displayed on a shifter. There is therefore a need in the art for a shifter that may display various information concerning the vehicle or accessory. There is also a need in the art for a shifter assembly that may include various buttons to affect the display of information or actuate various systems in the vehicle.

SUMMARY OF THE INVENTION

In one aspect there is disclosed a shifter assembly for a vehicle that includes a shift lever connected to a shifter and in communication with the vehicle and a transmission. A display is positioned on the shift lever indicating data of the vehicle or transmission. A start button is positioned on the shift lever and is linked with an ignition of the vehicle.

In another aspect there is disclosed a shifter assembly for a vehicle that includes a shift lever connected to a shifter and in communication with the vehicle and a transmission. A display is positioned on the shift lever indicating data of a vehicle or accessory. At least one button is attached to the shift lever. The at least one button operates an accessory linked with the button.

In a further aspect there is disclosed a shifter assembly for a vehicle that includes a shift lever connected to a shifter and in communication with the vehicle and a transmission. A display is positioned on the shift lever indicating data of the vehicle and transmission. The display provides data on actuation sequences to engage various modes of the transmission.

DETAILED DESCRIPTION OF THE PREFERRED EMBODIMENTS

Figure 1:
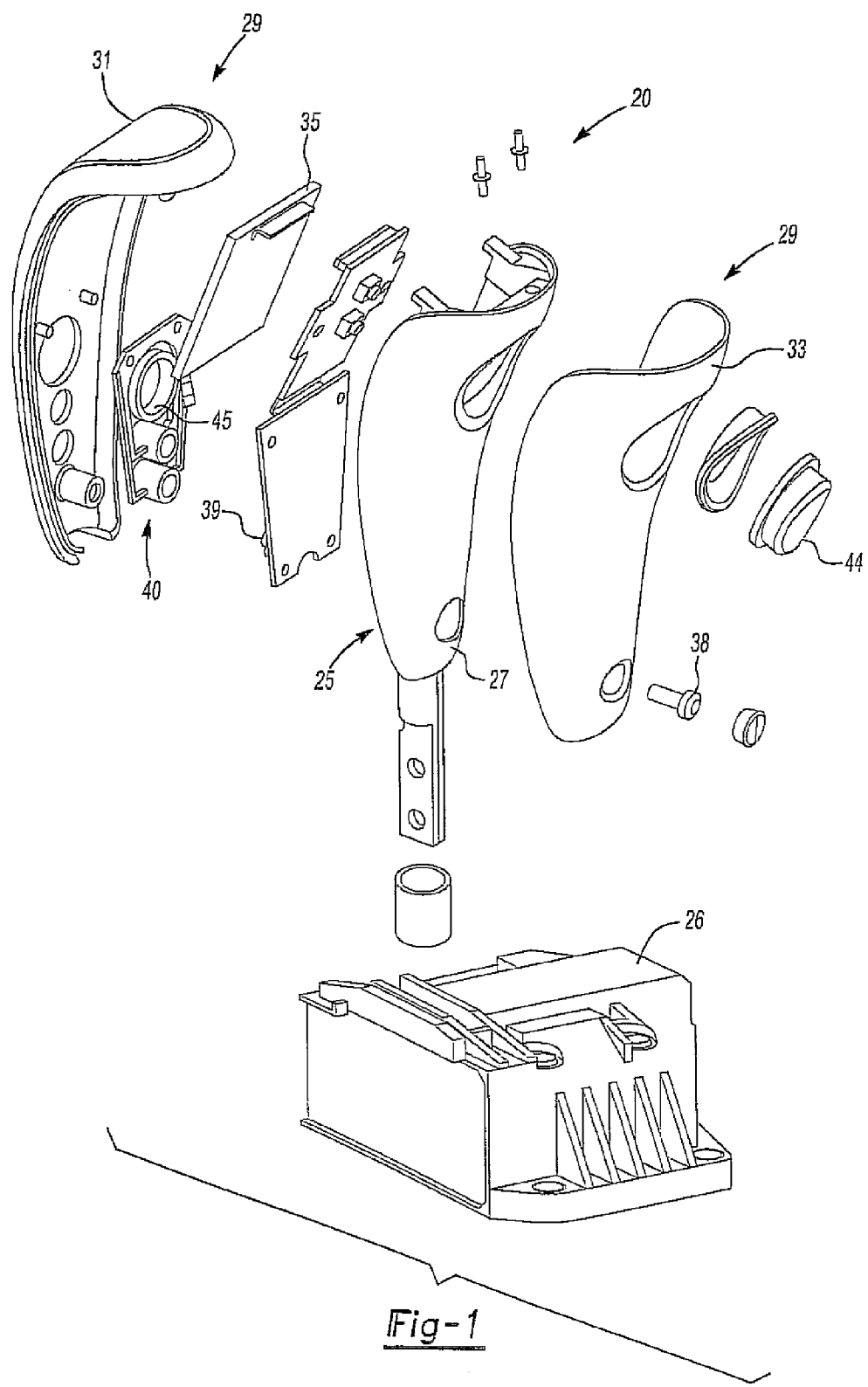
FIG. 1 is an exploded perspective view of one embodiment of a shifter assembly.
Figure 2:
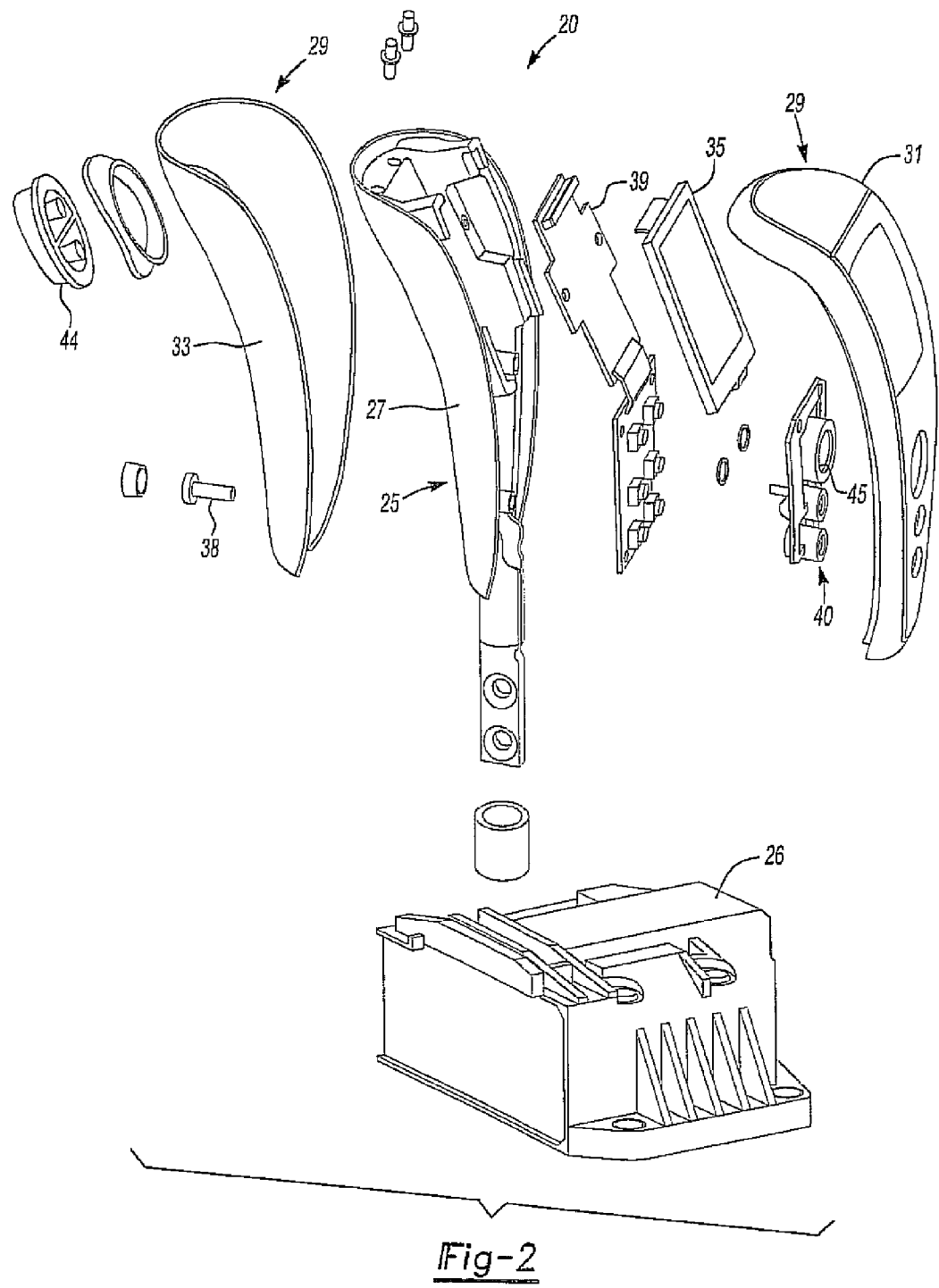
FIG. 2 is an exploded perspective view of one embodiment of a shifter assembly.
Figure 3:
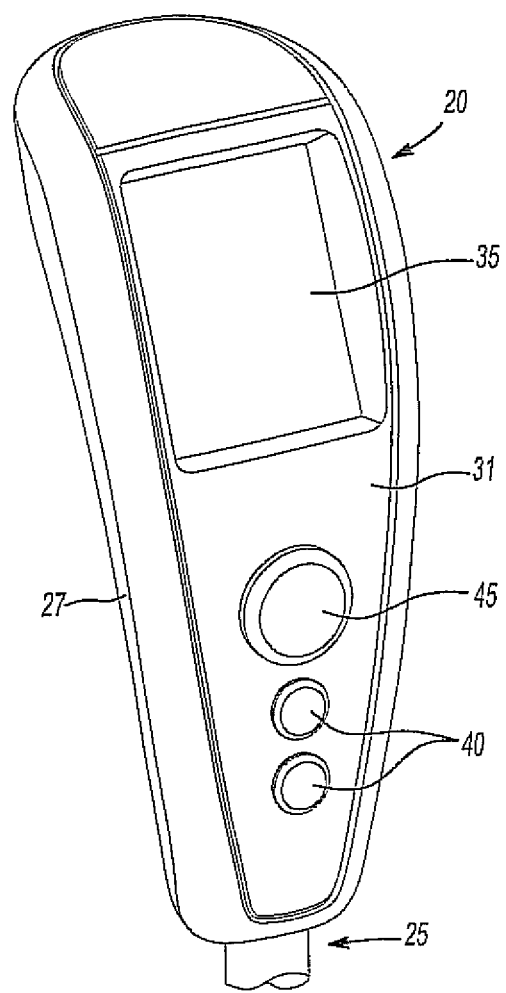
FIG. 3 is a perspective view of a shifter assembly.
Figure 4:
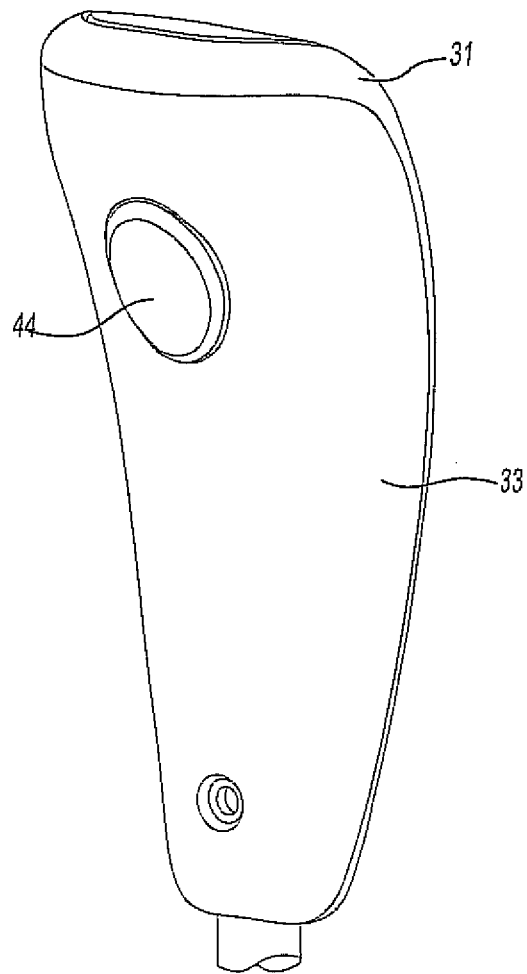
FIG. 4 is a perspective view of a shifter assembly.
Figure 5:
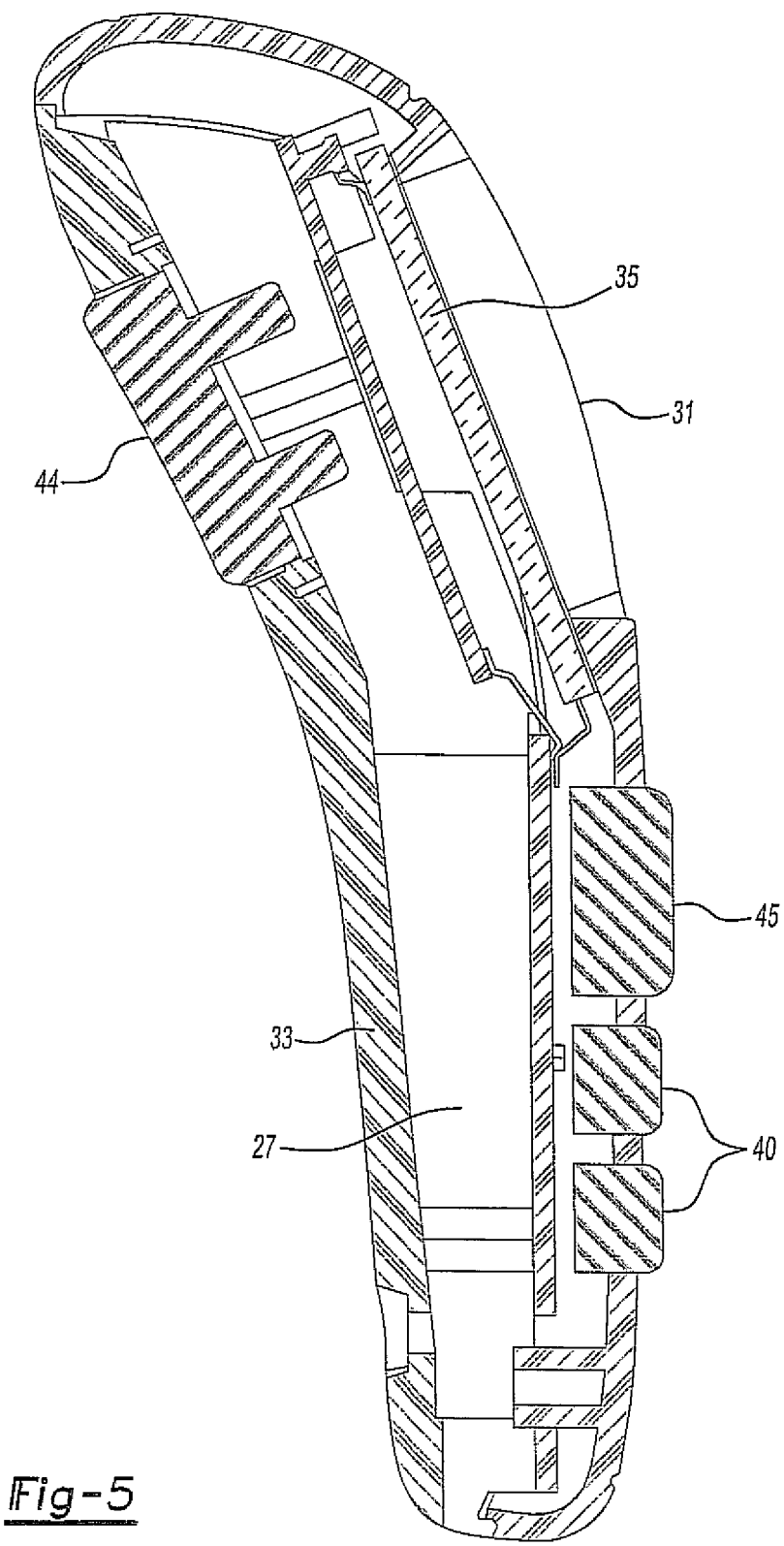
FIG. 5 is a sectional view of a shifter assembly.

Referring to the various figures, there is shown an embodiment of a shifter assembly 20. The shifter assembly 20 includes a shift lever 25 that is connected to a shifter 26 and may be positioned in a bezel 30 and is in communication with a vehicle or transmission. The shift lever 25 includes a display 35 positioned thereon that may indicate data of the mode of the transmission, as well as various other information of a vehicle. The shifter assembly 20 may be attached to the vehicle in various manners and will vary according to the type of shifter 26 and transmission of the vehicle.

Various transmissions capable of changing a gear ratio as the vehicle moves may be utilized and may be linked with the shifter assembly 20. In one aspect, the transmission may include various types of automatic transmissions. For example, hydraulic automatic transmissions, continuously variable transmissions as well as manually controlled automatic transmissions may be utilized. Various manually controlled automatic transmissions may have various manual controls allowing the driver to choose between preset shifting programs or select various gear ranges of the transmission. In one aspect, the shift lever 25 may communicate signals to an electronic control module that is linked with the transmission to control the ratio changes of the transmission. Such shift by wire or drive by wire systems may include mono-stable type shifters 26 that are linked with the transmission. In another aspect, the transmission may include a manual transmission which includes a shift lever 25 and display 35 to show various information of the vehicle.

As stated above, the display 35 on the shift lever 25 may indicate data of the mode of the transmission, as well as other vehicle information. Various modes may be displayed depending upon the vehicle and type of transmission. For example, vehicles may typically have modes indicating the status of the transmission including park, reverse, neutral, drive, overdrive or first or second gears. It should be realized that various transmissions may have additional modes and may have multiple gear ratios that may be indicated on the display 35. In one aspect, the display 35 may be a liquid crystal display or light emitting diode having a lens positioned over the diodes. Additionally, the display may be an OLED or VFD type of display. In one aspect the screen size may be of a sufficient size to provide adequate room for displaying information while fitting in the packaging space of the shift lever. In one aspect the screen may have a size of approximately 37×44 millimeters.

In another aspect, the shifter assembly 20 may include at least one button 40 attached to the shift lever 25. Various buttons 40 may be utilized that may be linked with various systems and components within a vehicle. For example, the at least one button 40 may include a start button 45 linked with an ignition of a vehicle. The start button 45 may be actuated to start and shut off the engine of the vehicle. Additionally, various numbers of buttons 40 may be positioned on the shift lever 25 to operate accessories 55 linked with the button 40. Various buttons 40 will be described in more detail below.

As stated above, the buttons 40 may be linked with various accessories 55 such that the display 35 on the shift lever 25 or another display in the vehicle details data of the accessory. In this manner, the button 40 may be linked with the accessory 55 such that an operator may select various criteria of the accessory. Various accessories 55 including audio systems, music players, phones, cruise controls, GPS systems, portable computers or other systems and accessories associated with a vehicle may be toggled or controlled using the button 40.

Referring to FIGS. 1-8, there is shown a shifter assembly 20. The embodiment depicted includes a bezel 30 that houses the shift lever 25 that is connected to the shifter 26. The bezel 30 may include various shapes and may include various illumination patterns and other aesthetically pleasing features. The shift lever 25 may includes various components including a lever member 27 and a housing 29 that may include a display portion 31 and a grip portion 33. The housing 29 may be attached to the lever member 27 using fasteners 38. It should be realized that any fastener or adhesive may be utilized.

An interlock button 44 may be received in the grip portion 33 of the housing 29. The interlock button 44 may be actuated by an operator to perform various actions. For example the interlock button 44 may be actuated to transition the shift lever 25 and transmission into or out of a park position. Additionally, the interlock button 44 may allow transition between various positions or modes such as drive, neutral or reverse. Further, the interlock button 44 may allow the transition between automatic and manual modes of the shifter. While the interlock button 44 is shown in the grip portion 33 of the housing 29 it may positioned at various locations that allows access by an operator.

The transmission may be actuated between various modes through movement of the shift lever 25. In one aspect, a mono-stable shifter 26 may be connected to the shift lever 25 and actuated by a tilting motion back and forth with the shift lever 25 returning to a starting position. Alternatively, the transmission may be actuated using a button 40 positioned on the shift lever 25. The display 35 may show the current mode of the transmission, as well as other information of the vehicle or an accessory 55 linked with the button 40.

Various displays including LCD, LED, OLED, VFD and other types may be positioned on the shift lever 25 in various relationships and positions. In the depicted embodiment, the display 35 is coupled to a PCB 39 which is received in the lever member 27. The display housing 31 is positioned over the display 35 and retains it in position. The display housing 31 may include a window that allows the screen to show through the housing 31. Alternatively the housing 31 may include a clear portion that allows the display 35 to be seen. In one aspect, the display 35 may include a removable device that is positioned within a recess of the shift lever 25 or within the bezel 30. In this manner, a device such as a music player or phone or other accessory 55 having a display 35 screen may display a mode of the transmission, as well as display other information.

The shift lever 25 may have buttons 40 positioned at various locations relative to the shift lever 25. In the depicted embodiment, the buttons 40 may be positioned over the PCB 39, as described above. The buttons 40 may project through openings formed in the housing 29. It should be realized that various buttons 40 may be positioned in various locations on the shift lever 25 to provide an ergonomic and aesthetically pleasing appearance. Additionally, the buttons 40 may be integrated into the display 35. For example the display 35 may be a touch screen that projects a button image that may be actuated by an operator.

The shift lever 25 is in communication with a shifter 26, such as the mono-stable shifter, a transmission or vehicle. Data may be received or sent by the shifter 26 or shift lever 25 to various control systems or components of the vehicle. The shift lever 25 may receive information about what images to output on the display 35 and what types of information to output. Additionally, the shift lever 25 may also receive signals concerning the lighting, backlighting of the display 35 and buttons 40. The lighting parameters may include the intensity, color or blink pattern of the display 35 or buttons 40. In addition, the shift lever 25 may transmit information to the vehicle about which buttons 40 have been depressed or actuated to control the various positions of the transmission or to control any accessory 55 that is linked with the buttons 40.

Figure 6:
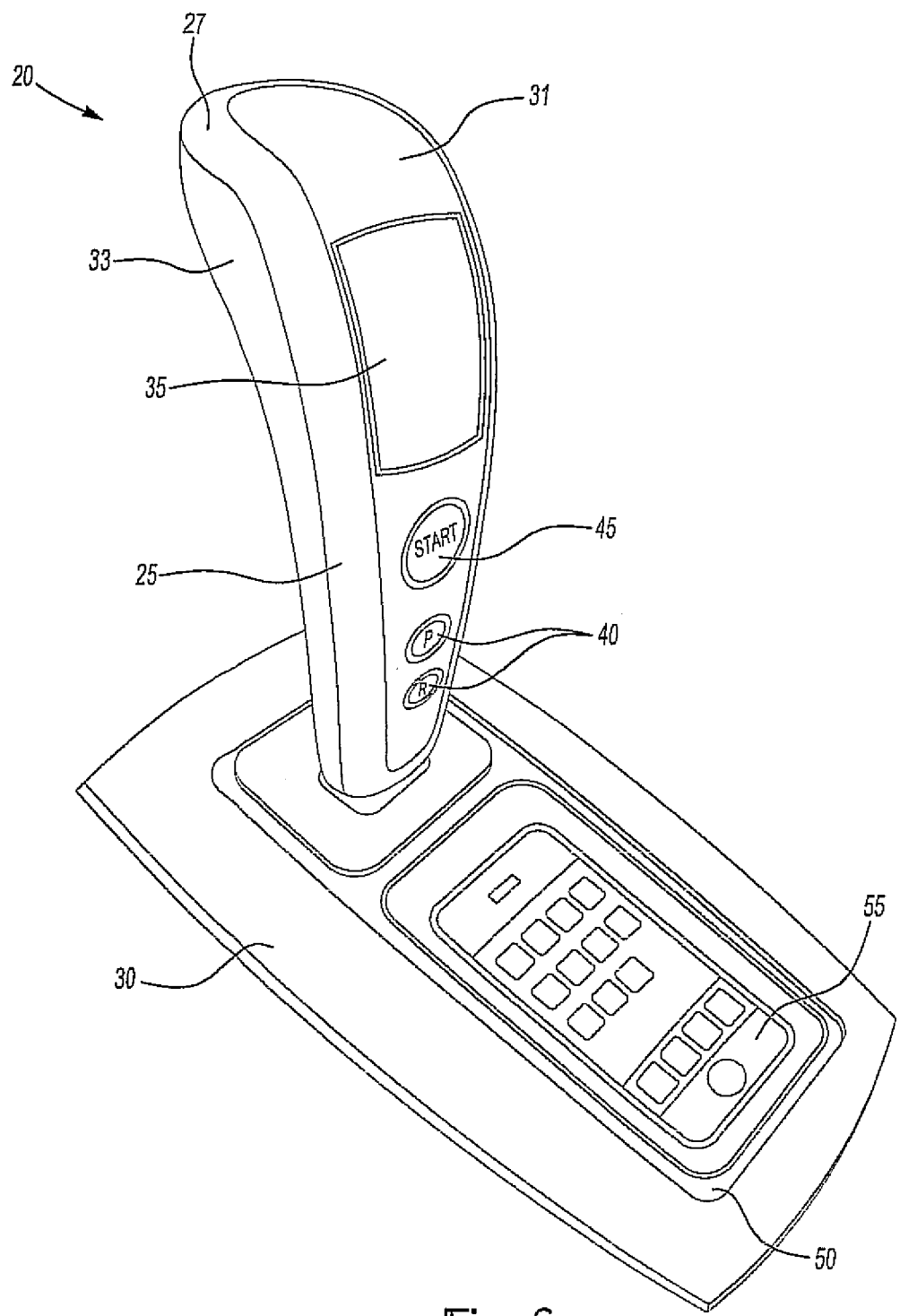
FIG. 6 is a perspective view of a shifter assembly a shift lever and bezel.
Figure 7:
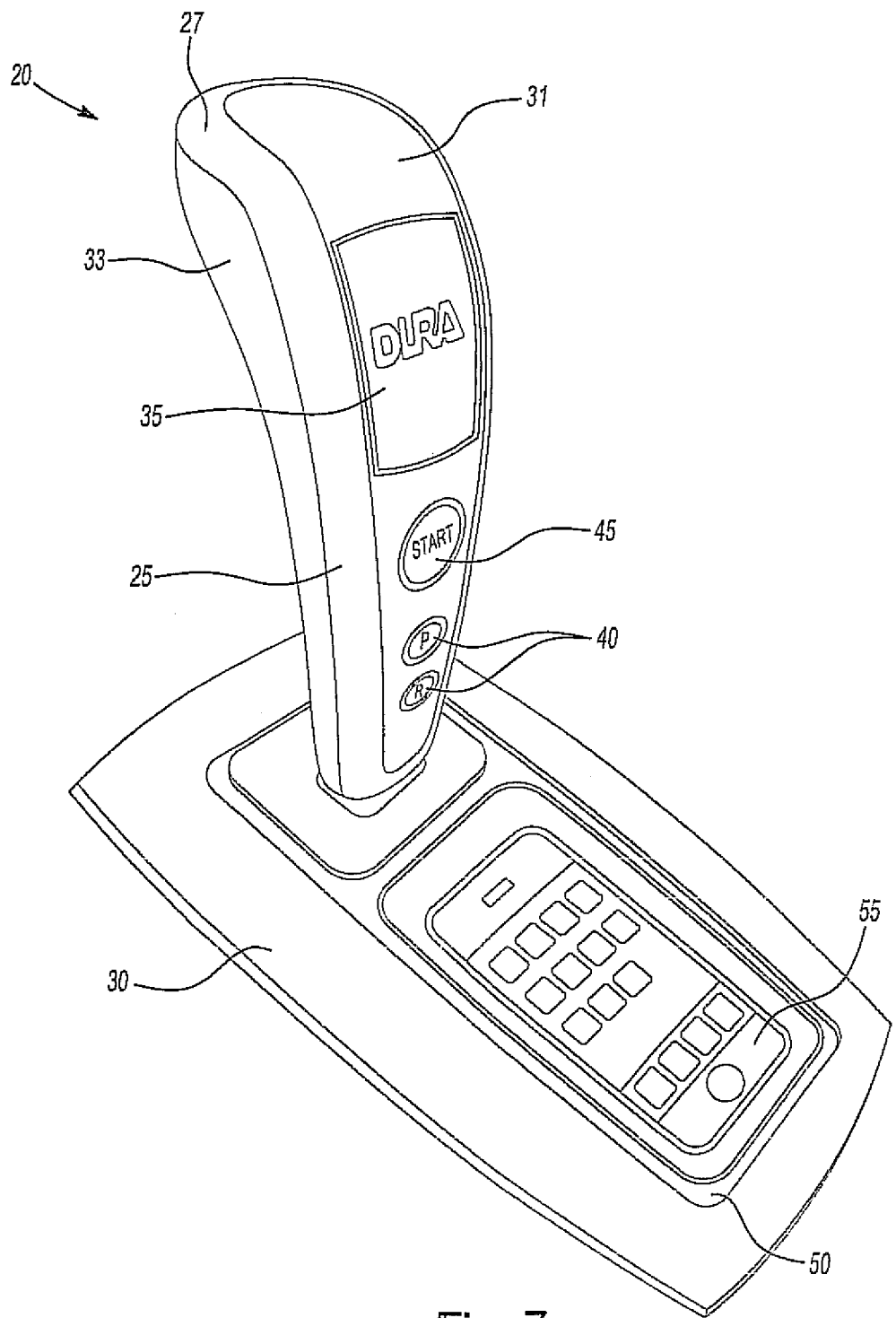
FIG. 7 is a perspective view of the embodiment of FIG. 6 in a mode prior to depression of a start button.
Figure 8:
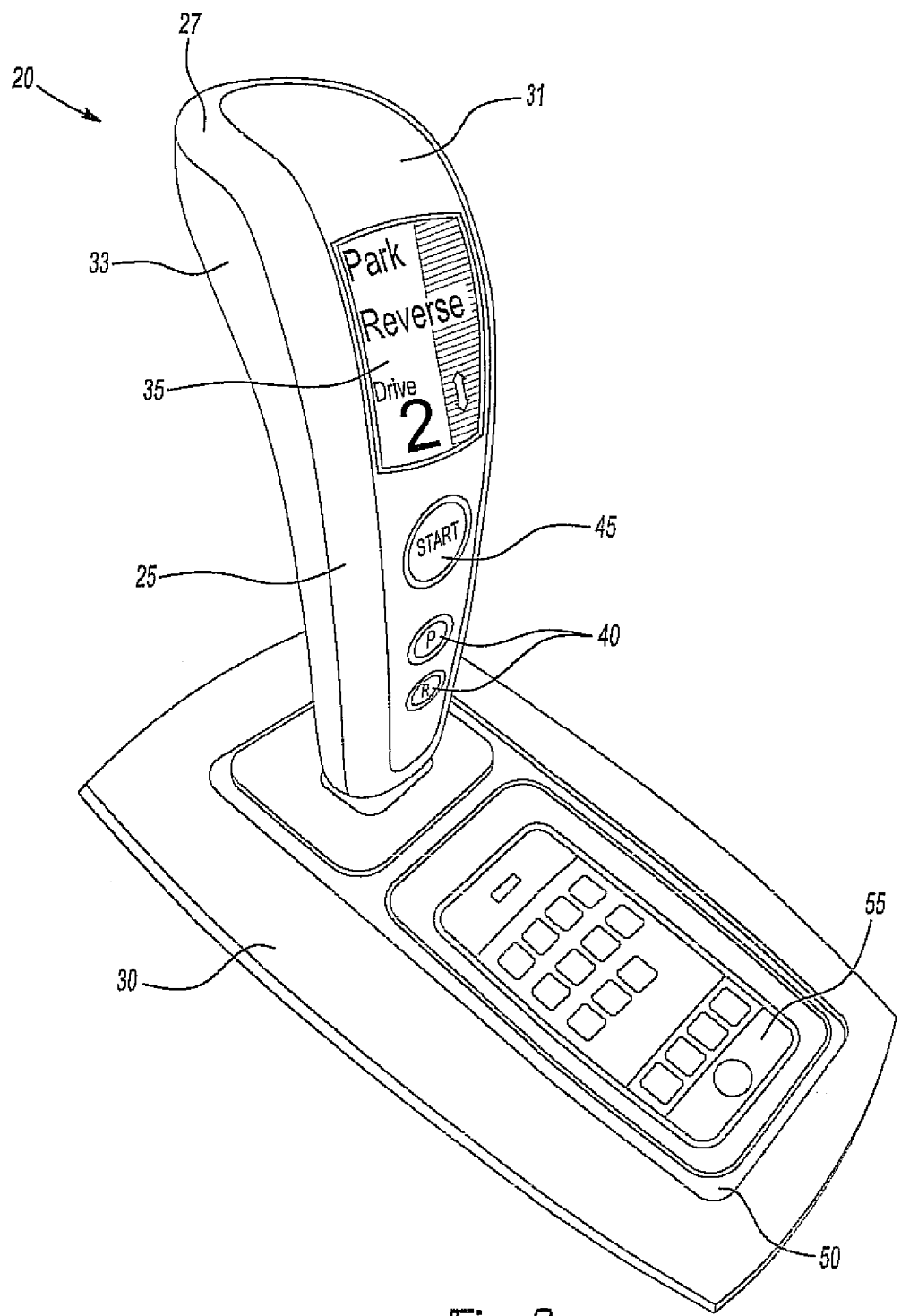
FIG. 8 is a perspective view of the embodiment of FIGS. 6 and 7 in a running state after the start button has been depressed.

Referring to FIG. 6-8 the bezel 30 may also include a docking station 50 into which an accessory device 55 may be positioned. The accessory device 55 may be controlled using the buttons 40 on the shift lever 25 with the display 35 indicating the mode of the transmission, as well as other information of an accessory device 55. The docking station 50 may provide communication between the shifter assembly 20 and the accessory device 55, as well as provide a charging station for the accessory device 55.

The embodiment depicted in FIGS. 1-8 may include a start button 45 positioned on the shift lever 25. The start button 45 may be linked with an ignition system of a vehicle to actuate the ignition between on and off selections. In this manner, an operator may depress the start button 45 on the shift lever 25 to start and stop an engine of a vehicle. The shift lever 25 may also include the interlock button 44, as described above. In one aspect the inter lock button 44 may be positioned on the shift lever 25 such that an operator may actuate the interlock button 44 with a hand positioned over a top portion of the shift lever 25 or around a side of the shift lever 25.

Additionally, the shift lever 25 may include additional buttons 40. In the depicted embodiment, one additional button 40 labeled with a P may actuate the parking brake between engaged and disengaged positions. Additionally, another button 40 labeled S may adjust between various modes of the transmission including a sport mode or overdrive mode. In use, the shift lever 25 may be moved back and forth to actuate between the various modes of the transmission. It should be realized that additional buttons 40 may be included or the buttons 40 described above may be linked to other components or accessory devices.

Referring to FIGS. 7-8, there is shown a starting sequence utilizing the shifter assembly 20. As shown in FIG. 7, the start button 45 may include a background color that will pulse when the engine is in a shut down or non-operational mode. An operator may press the start button 45 thereby triggering the ignition and starting the engine of the vehicle. The display 35 may then illuminate with a start up graphical sequence that may display various information such as the manufacturer of the shifter or vehicle or other information. The bezel 30 and housing surrounding the docking station 50 may illuminate providing an aesthetically pleasing appearance to the bezel 30 and shifter assembly 20. The information or data indicated in the display 35 may then transition to the mode of the transmission as shown in FIG. 8. An operator may then actuate the inter lock button 44 and the shift lever 25 by moving it back and forth to select various modes of the transmission.

The display 35 provided on the shift lever 25 or bezel 30 as described above may indicate various data including the mode of the transmission and menus of accessory devices linked with the shifter assembly 20 and actuated through the buttons 40. The display 35 may also provide data on actuation sequences to engage various modes of the transmission. For example, the display 35 may indicate the correct actuation sequence to shift between various modes of the transmission, such as from a park mode to a drive mode. Additionally, the display 35 may indicate the actuation sequence for shifting between other modes of the transmission such as to reverse, neutral or any of the gears associated with the transmission. In this manner the operator of the vehicle will not be confused or need to learn various actuation sequences. The information needed to switch between the various modes of the transmission may be indicated on the display 35. In addition, the display 35 may be linked with an onboard computer to display additional information such as operating parameters of the vehicle or the status of various accessory devices 55. In one aspect the shift lever 25 may transmit signals between the shifter, a transmission controller, an instrument cluster or other electronic control unit in the vehicle.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A shifter assembly for a vehicle comprising:
   a shift lever connected to a shifter and in communication with the vehicle and a transmission;
   a display positioned on the shift lever indicating data of the vehicle or transmission;
   a start button positioned on the shift lever, the start button linked with an ignition of the vehicle;
   at least one button positioned on the shift lever, the at least one button operable connected to and controlling an accessory linked with the button wherein the accessory is selected from: audio systems, music players, cruise controls, phones, GPS systems, and portable computers and wherein the display screen provides data of the accessory and data of the transmission, the transmission including park, reverse, neutral, and drive.

2. The shifter assembly of claim 1 wherein the shift lever is positioned in a bezel.

3. The shifter assembly of claim 1 wherein the shift lever communicates signals between devices selected from: the shifter, a transmission controller, an instrument cluster or other electronic control unit in the vehicle.

4. The shifter assembly of claim 1 wherein the transmission is selected from: an automatic transmission, a manual transmission, and an automatic transmission having a manual mode.

5. The shifter assembly of claim 1 wherein the shift lever includes an inter lock button positioned thereon.

6. The shifter assembly of claim 1 wherein the shift lever is attached to a mono-stable shifter allowing actuation of the shift lever in a forward and backwards motion wherein the shift lever returns to an initial position.

7. The shifter assembly of claim 1 wherein the at least one button comprises a plurality of buttons.

8. The shifter assembly of claim 1 wherein the at least one button includes a transmission tuning button and a parking brake button.

9. The shifter assembly of claim 1 wherein the display provides data on actuation sequences to engage various modes of the transmission.

10. The shifter assembly of claim 2 wherein the bezel includes a docking station for an accessory.

11. The shifter assembly of claim 10 wherein the docking station provides communication between the accessory, display and buttons on the shift lever.

12. The shifter assembly of claim 10 wherein the docking station provides electrical current for charging the accessory.

13. The shifter assembly of claim 1 wherein the display comprises a removable device positioned on the shift lever or bezel.

14. The shifter assembly of claim 1 wherein the display indicates operating parameters of the vehicle.

15. A shifter assembly for a vehicle comprising:
   a shift lever connected to a shifter and in communication with the vehicle and a transmission;
   a display positioned on the shift lever indicating data of the vehicle or an accessory wherein the accessory is selected from: audio systems, music players, cruise controls, phones, GPS systems, or portable computer;
   at least one button positioned on the shift lever, the at least one button operably connected to and controlling the accessory linked with the button wherein the display screen additionally provides data of the accessory and data of the transmission including park, reverse, neutral, and drive.

* * * * *